(No Model.)
P. NOLAN.
NUT LOCKING WASHER.
No. 477,020. Patented June 14, 1892.
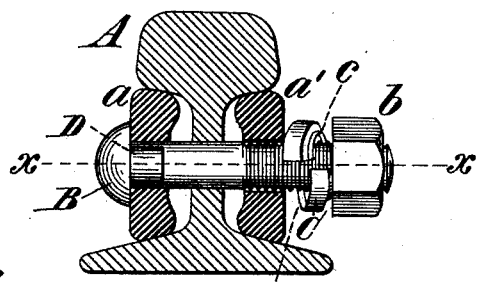
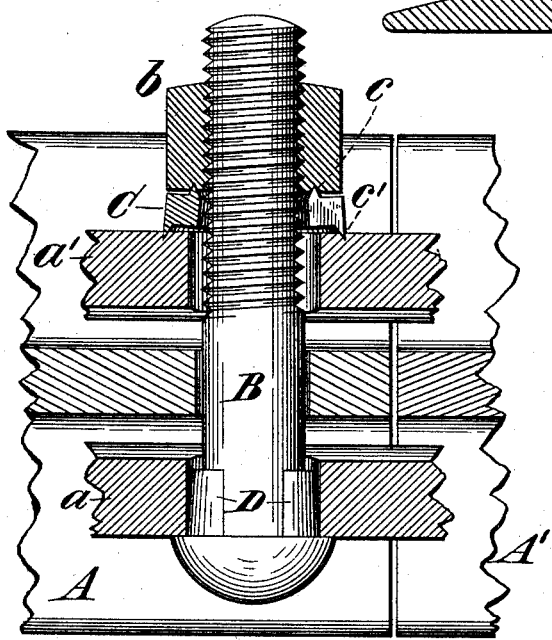
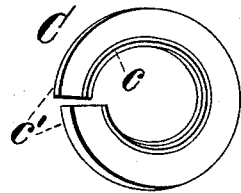
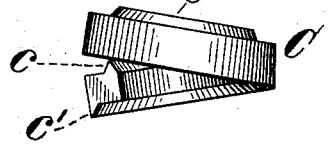
Attest
G. W. Cary
C. B. Donaldson.
Inventor
Patrick Nolan,
by John E. Jones,
his Attorney.

UNITED STATES PATENT OFFICE.

PATRICK NOLAN, OF BIRMINGHAM, ALABAMA.

NUT-LOCKING WASHER.

SPECIFICATION forming part of Letters Patent No. 477,020, dated June 14, 1892.

Application filed July 7, 1890. Serial No. 357,993. (No model.)

*To all whom it may concern:*

Be it known that I, PATRICK NOLAN, a citizen of the United States, residing at Birmingham, in the county of Jefferson and State of Alabama, have invented certain new and useful Improvements in Nut-Locks, of which the following is a specification.

My invention relates to that class of nut-locks in which an open spring ring or washer having an annular ridge or elevation on its outer face is used in connection with the customary nut and bolt, said annular ridge or elevation engaging the inner face or bottom of said nut and suitably embedding itself therein to prevent the accidental reverse movement of said nut; and my invention consists in the provision, in connection with a bolt and nut, of an open spring ring or washer having on its outer face (that which lies contiguous with the inner face of the nut) an annular ridge or elevation of inverted-V shape around its inner edge and on its inner face (that which lies contiguous with the outer face of the fish-plate or other abutting object) a sharp raised edge or elevation around its outer edge or periphery, all as hereinafter fully described, and particularly pointed out in the claims.

In the accompanying drawings, Figure 1 is a transverse section of an ordinary track-rail and fish-plates, showing a fastening bolt and nut in longitudinal elevation therein and an elevation of my improved locking device on said bolt intermediate the nut and one of said fish-plates, the said locking device being shown in unlocked position ready for compression by the "turning home" of the nut; Fig. 2, a full-sized broken sectional plan on $xx$, Fig. 1, of part of a track-joint, showing my improvement in full locking position; Fig. 3, a plan view of my improvement, showing the face thereof which lies contiguous with the inner face of the nut; and Fig. 4, an elevation of my locking device in its open or normal condition, the same as in Fig. 3.

A A' represent the ends of two abutting track-rails; $a\,a'$, the customary fish-plates; B, the bolt, and $b$ the usual fastening-nut. As these parts are merely shown to illustrate one of the many applications of my invention and are of any common suitable construction, a further detailed description thereof is not deemed necessary herein.

C represents my improved locking device placed on the bolt B intermediate the nut $b$ and fish-plate $a'$, and composed of an open ring or washer having an annular ridge or elevation $c$ around the inner edge of its outer face or top, and a sharp ridge or elevation $c'$ around the outer edge of its inner face or bottom, all as very clearly shown in the several views of the drawings. The ridge or elevation $c$ is beveled or inclined both inwardly and outwardly into inverted-V shape, the slope of the inner bevel being greater than that of the outer one or less steeply inclined, as clearly shown in both Figs. 2 and 4, and the peripheral ridge or elevation $c'$ is preferably beveled or inclined on its inner face only down to a sharp edge with the outer straight face of the ring, as also shown in Figs. 2 and 4, the purpose of which will be presently described.

The ring or washer C is made of spring metal of suitable strength and elasticity, and with its open ends spread away from each other laterally or "out of line," as shown in Figs. 1 and 4, for exerting the proper outward pressure or tension on the nut.

In the operation of my device when the nut has been turned down sufficient to cause its inner face to have a full bearing upon the annular ridge $c$, thereby compressing the spring-ring C, it simultaneously causes the sharp edge or flange $c'$ on the inner face of said spring-ring to fully engage or bear upon the adjacent fish-plate $a'$, and on the further and final turning down of said nut into place the sharp ridges $c$ and $c'$ partially embed themselves in the inner face of said nut and the outer face of said fish-plate, respectively, as shown in Fig. 2. It will be seen in said Fig. 2 that on the said final turning home of said nut and the consequent partial embedding or cutting of said sharp ridges into the substance of both the nut and fish-plate the inner portion of the spring-ring is canted or forced inwardly toward the fish-plate by the pressure brought to bear on the inner annular ridge $c$, the peripheral ridge or flange $c'$ forming a pivotal and frictional bearing therefor, thus causing the metal of the nut intermediate the ridge $c$ and the threaded portion of the bolt to pack more closely and grip very firmly and tightly in and around said bolt, and thereby obviating any possible liability of a reverse movement of the nut or its becoming loose. The spring-ring C, as shown in said Fig. 2, and just described, thus practically forms what is commonly known as a "disk-spring," in which the outward pressure caused by said inward canting provides the necessary and desired elasticity in said spring-ring, and thereby exerts and maintains the proper gripping force of the nut on the bolt. The ridge or flange $c'$ on the bottom or inner face of said spring-ring is of a greater diameter than the usual elongated bolt hole or opening in the fish-plate, as shown in said Fig. 2, thus preventing any liability of any part of said flange getting or sinking into said hole to in anywise interfere with or affect its described function.

It will be seen in Fig. 3 that the lock-washer C is not a true circle, but is of oblong shape and that the opposite ends of the single coil comprising it are turned or spread radially out of line. I prefer to construct it so, and also with the inner bevel on the annular ridge $c$ of a greater slope than the outer bevel, (as hereinbefore mentioned,) for the reason that as its two ends would travel in two separate and distinct paths it thus forms a better and finer barrier or grip on the bolt against a reverse or backward movement of the nut than if it were a true circle, as is clearly obvious, the said inner bevel guiding or feeding and forcing the metal of the nut closely and firmly in and around said bolt. The cutting or embedding of said raised edges or ridges $c$ and $c'$ into the nut and fish-plate, as before stated, combines with said gripping-force of the spring-ring C on the bolt in firmly and effectually holding both the nut and lock-ring in position on said bolt.

It is obvious that the ridge $c'$ could be arranged on the inner face of the spring-ring a slight distance inwardly from the periphery, if desired; or, in other words, at any point between the center of the thickness or width of the metal composing said ring and said periphery without materially altering the effect, although I much prefer to construct it on the periphery, as shown, because it both augments and facilitates the canting operation, which has been quite fully hereinbefore described.

The customary enlargements or wings D D on the bolt (under its head) and lying in the elongated hole of fish-plate $a$, as shown in Figs. 1 and 2, are provided to prevent the turning of said bolt. It will be readily seen that the forcing of the metal of the nut around the bolt will not in any wise injure or impair the threads of either said nut or bolt, and when necessary the nut can be removed with the proper appliance and force.

I claim—

1. A nut-lock comprising a ring or washer having a sharp-edged ridge upon its opposite faces, the one upon one side being located around the outer edge or periphery of the ring and the one upon the other side being located around the inner edge, whereby the inner ridge is forced inward toward the center of the ring by the pressure of the nut, substantially as described.

2. A nut-lock comprising a spiral spring or washer, each face of which is provided with a sharp-edged ridge, the one upon one face being located around the outer edge and the other one being located around the inner edge, substantially as described.

PATRICK NOLAN.

Witnesses:
 JNO. S. KENNEDY,
 C. E. RICKEY.